(12) United States Patent
Wallace et al.

(10) Patent No.: US 8,712,400 B2
(45) Date of Patent: Apr. 29, 2014

(54) RANGE EXTENSION TECHNIQUES FOR A WIRELESS LOCAL AREA NETWORK

(75) Inventors: Mark S Wallace, Bedford, MA (US); Jay Rodney Walton, Carlisle, MA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 13/277,437

(22) Filed: Oct. 20, 2011

(65) Prior Publication Data

US 2012/0127978 A1    May 24, 2012

Related U.S. Application Data

(62) Division of application No. 11/609,493, filed on Dec. 12, 2006, now Pat. No. 8,064,414.

(60) Provisional application No. 60/750,183, filed on Dec. 13, 2005.

(51) Int. Cl.
    *H04W 4/00* (2009.01)
(52) U.S. Cl.
    USPC ........ 455/422.1; 455/102; 370/338; 370/333; 375/150; 375/343
(58) Field of Classification Search
    USPC ......... 370/338, 335, 342, 441, 479, 350, 349, 370/343, 470, 333; 375/150, 140–141, 130, 375/145, 146; 348/460, 461, 484; 379/88.13; 455/422.1, 102, 522
    See application file for complete search history.

(56) References Cited

U.S. PATENT DOCUMENTS

| | | | |
|---|---|---|---|
| 5,305,348 A | | 4/1994 | Izumi |
| 6,563,858 B1 * | | 5/2003 | Fakatselis et al. ............ 375/148 |
| 6,928,105 B2 | | 8/2005 | Ovalekar |
| 7,099,380 B1 | | 8/2006 | Feng et al. |
| 7,463,589 B2 * | | 12/2008 | Diepstraten et al. .......... 370/241 |

(Continued)

FOREIGN PATENT DOCUMENTS

| CN | 1303193 A | 7/2001 |
|---|---|---|
| CN | 1312979 | 9/2001 |

(Continued)

OTHER PUBLICATIONS

International:Search Report, PCT/US2006/062033—International Search Authority—European Patent Office—Apr. 23, 2008.

(Continued)

*Primary Examiner* — Mahendra Patel
(74) *Attorney, Agent, or Firm* — QUALCOMM IP Department; James Hunt Yancey, Jr.

(57) ABSTRACT

Techniques for extending transmission range in a WLAN are described. In an aspect, a receiving station determines the frequency error between a transmitting station and the receiving station based on one or more initial packet transmissions and corrects this frequency error for subsequent packet transmissions received from the transmitting station. The residual frequency error is small after correcting for the frequency error and allows the receiving station to perform coherent accumulation/integration over a longer time interval to detect for a packet transmission. The longer coherent accumulation interval improves detection performance, especially at low SNRs for extended transmission range. The techniques may be used whenever the receiving station knows the identity of the transmitting station, e.g., if the subsequent packet transmissions are scheduled. Other aspects, embodiments, and features are also claimed and described.

13 Claims, 12 Drawing Sheets

(56) References Cited

U.S. PATENT DOCUMENTS

| | | |
|---|---|---|
| 8,064,414 B2 | 11/2011 | Wallace et al. |
| 2001/0036195 A1 | 11/2001 | Garyantes et al. |
| 2001/0043641 A1* | 11/2001 | Harms et al. ................ 375/130 |
| 2002/0086693 A1 | 7/2002 | Ahmad et al. |
| 2002/0138795 A1 | 9/2002 | Wang |
| 2003/0007473 A1* | 1/2003 | Strong et al. ................ 370/338 |
| 2004/0218570 A1* | 11/2004 | Black et al. ................ 370/335 |
| 2005/0233710 A1 | 10/2005 | Lakkis et al. |
| 2005/0259723 A1 | 11/2005 | Blanchard |
| 2005/0265397 A1 | 12/2005 | Chapman et al. |
| 2006/0039343 A1* | 2/2006 | Anderson et al. ............ 370/342 |
| 2006/0135145 A1 | 6/2006 | Redi |
| 2006/0168612 A1 | 7/2006 | Chapman et al. |
| 2006/0222130 A1 | 10/2006 | Dominique et al. |
| 2006/0268961 A1* | 11/2006 | Prestwich et al. ............ 375/146 |
| 2007/0104255 A1* | 5/2007 | Koppelaar ................ 375/150 |
| 2012/0114019 A1 | 5/2012 | Wallace et al. |

FOREIGN PATENT DOCUMENTS

| | | |
|---|---|---|
| CN | 1585290 A | 2/2005 |
| EP | 845888 A2 | 6/1998 |
| JP | 10126310 A | 5/1998 |
| JP | 2001136149 A | 5/2001 |
| JP | 2001217345 A | 8/2001 |
| JP | 2001524268 A | 11/2001 |
| JP | 2002539667 A | 11/2002 |
| JP | 2005130429 A | 5/2005 |
| KR | 200172616 | 7/2001 |
| WO | 9639749 A1 | 12/1996 |
| WO | WO9920023 | 4/1999 |
| WO | WO9966649 | 12/1999 |
| WO | WO0014570 | 3/2000 |
| WO | 0054424 A2 | 9/2000 |
| WO | WO2004114596 A1 | 12/2004 |
| WO | WO2005071911 | 8/2005 |

OTHER PUBLICATIONS

Shaw Yuan W.., et al., "Rapid Carrier.Acquisition from Baud-Rate Samples," IEEE TranSactiOns on Ccimmunidations, IEEE Service Center,.,Piscataway, NJ, US, vol. 47, No. 4, Apr. 1999, XP011009399, ISSN: 0090-6778.

Written Opinion, PCT/US2006/062033—International Search Authority—European Patent Office—Apr. 23, 2008.

Wang, Y-P E et al.: "Initial Frequency Acquisition in W-CDMA," Vehicular Technology Conference, 1999, VTC 1999—Fall. IEEE VTS 50th Amsterdam, Netherlands Sep. 19-22, 1999, Piscataway, NJ, USA, IEEE, US, Sep. 19, 1999, pp. 1013-1017, XP010353116, ISBN: 0-7803-5435-4.

\* cited by examiner

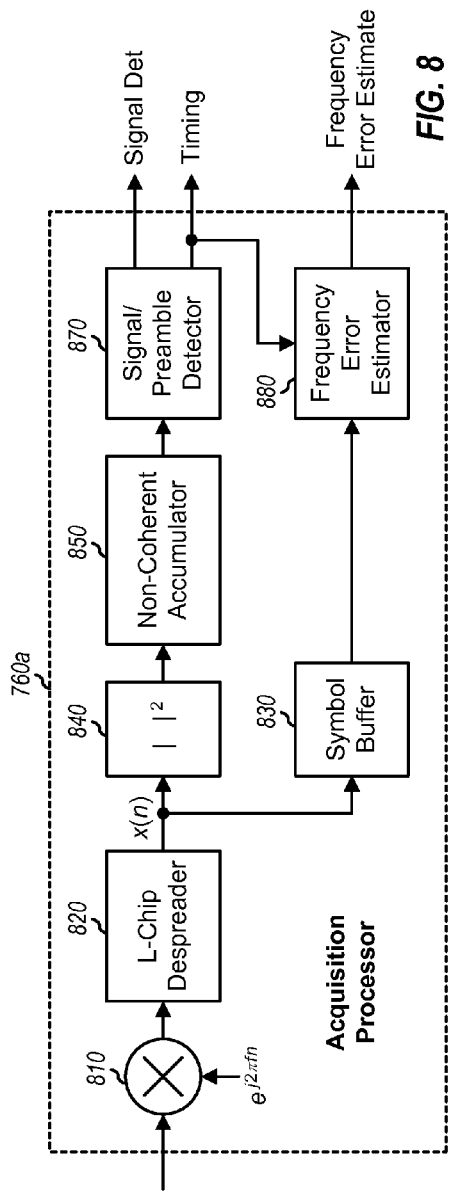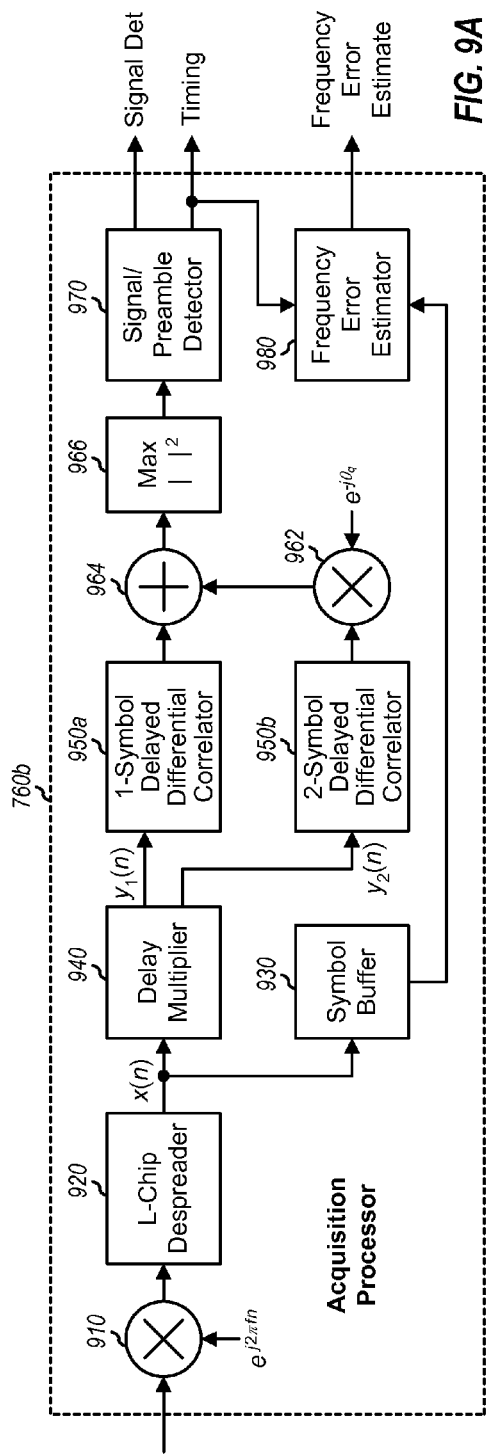

RANGE EXTENSION TECHNIQUES FOR A WIRELESS LOCAL AREA NETWORK

CROSS REFERENCE TO RELATED APPLICATIONS & PRIORITY CLAIM

The present Application for Patent is a divisional of patent application Ser. No. 11/609,493, entitled "RANGE EXTENSION TECHNIQUES FOR A WIRELESS LOCAL AREA NETWORK" filed Dec. 12, 2006, pending, which claims priority to Provisional Application No. 60/750,183, entitled "RANGE EXTENSION TECHNIQUES FOR A WIRELESS LOCAL AREA NETWORK," filed Dec. 13, 2005. Both of said applications are assigned to the assignee hereof and are hereby expressly incorporated by reference herein as is fully set forth below for all purposes.

TECHNICAL FIELD

The present disclosure relates generally to communication, and more specifically to techniques for extending transmission range for a wireless local area network (WLAN).

BACKGROUND

Wireless communication networks are widely deployed to provide various communication services such as data, voice, video, and so on. These wireless networks include wireless wide area networks (WWANs) that provide communication coverage for large geographic areas (e.g., cities), wireless local area networks (WLANs) that provide communication coverage for medium-size geographic areas (e.g., buildings), and wireless personal area networks (WPANs) that provide communication coverage for small geographic areas (e.g., homes).

IEEE 802.11 is a family of standards developed by The Institute of Electrical and Electronics Engineers (IEEE) for WLANs. These standards cover medium range radio technologies. IEEE Std 802.11 1999 Edition (or simply, "802.11") supports data rates of 1 and 2 mega bits/second (Mbps) in the 2.4 giga Hertz (GHz) frequency band using frequency hopping spread spectrum (FHSS) and direct sequence spread spectrum (DSSS). IEEE Std 802.11a-1999 (or simply, "802.11a") supports data rates of 6 to 54 Mbps in the 5 GHz frequency band using orthogonal frequency division multiplexing (OFDM). IEEE Std 802.11b-1999 (or simply, "802.11b") supports data rates of 1 to 11 Mbps in the 2.4 GHz band using DSSS. IEEE Std 802.11g-2003 (or simply, "802.11g") supports data rates of 1 to 54 Mbps in the 2.4 GHz band using DSSS and OFDM. These various IEEE 802.11 standards are known in the art and publicly available.

The lowest data rate supported by the IEEE 802.11 standards is 1 Mbps. A certain minimum signal-to-noise-and-interference ratio (SNR) is required for reliable reception of a transmission sent at the lowest data rate of 1 Mbps. The range of the transmission is then determined by the geographic area within which a receiving station can achieve the required SNR or better. In certain instances, it is desirable to send a transmission with a range that is greater than the range for the lowest data rate supported by the IEEE 802.11 standards. Furthermore, it is desirable to achieve the greater transmission range with minimum increase in hardware complexity at both the transmitting and receiving stations.

There is therefore a need in the art for cost-effective techniques to extend the transmission range for a WLAN.

SUMMARY OF SOME EXEMPLARY EMBODIMENTS

Techniques for extending transmission range in a WLAN are described herein. In an aspect, a receiving station determines the frequency error between a transmitting station and the receiving station based on one or more initial packet transmissions and corrects this frequency error for subsequent packet transmissions received from the transmitting station. A packet transmission is a transmission of some amount of data within some amount of time. The residual frequency error is small after correcting for the frequency error and allows the receiving station to perform coherent accumulation/integration over a longer time interval to detect for a packet transmission. The longer coherent accumulation interval improves detection performance, especially at low SNRs that may be encountered for extended transmission range. The frequency correction techniques may be used whenever the receiving station knows the identity of the transmitting station, which may be the case, e.g., if the subsequent packet transmissions are scheduled.

In another aspect, a preamble is generated with a longer spreading sequence and sent with each packet transmission. The receiving station may perform coherent accumulation over the length of the longer spreading sequence to achieve more reliable detection of the preamble at low SNRs.

Various aspects and embodiments of the invention are described in further detail below.

BRIEF DESCRIPTION OF THE DRAWINGS

FIG. 8 shows an embodiment of an acquisition processor.

FIGS. 9A through 9C show another embodiment of the acquisition processor.

DETAILED DESCRIPTION OF SOME EXEMPLARY EMBODIMENTS

The range extension techniques described herein may be used for various radio technologies and standards, such as IEEE 802.11. For clarity, much of the following description is for 802.11b and 802.11g, which is commonly referred to as 802.11b/g.

Figure 1:
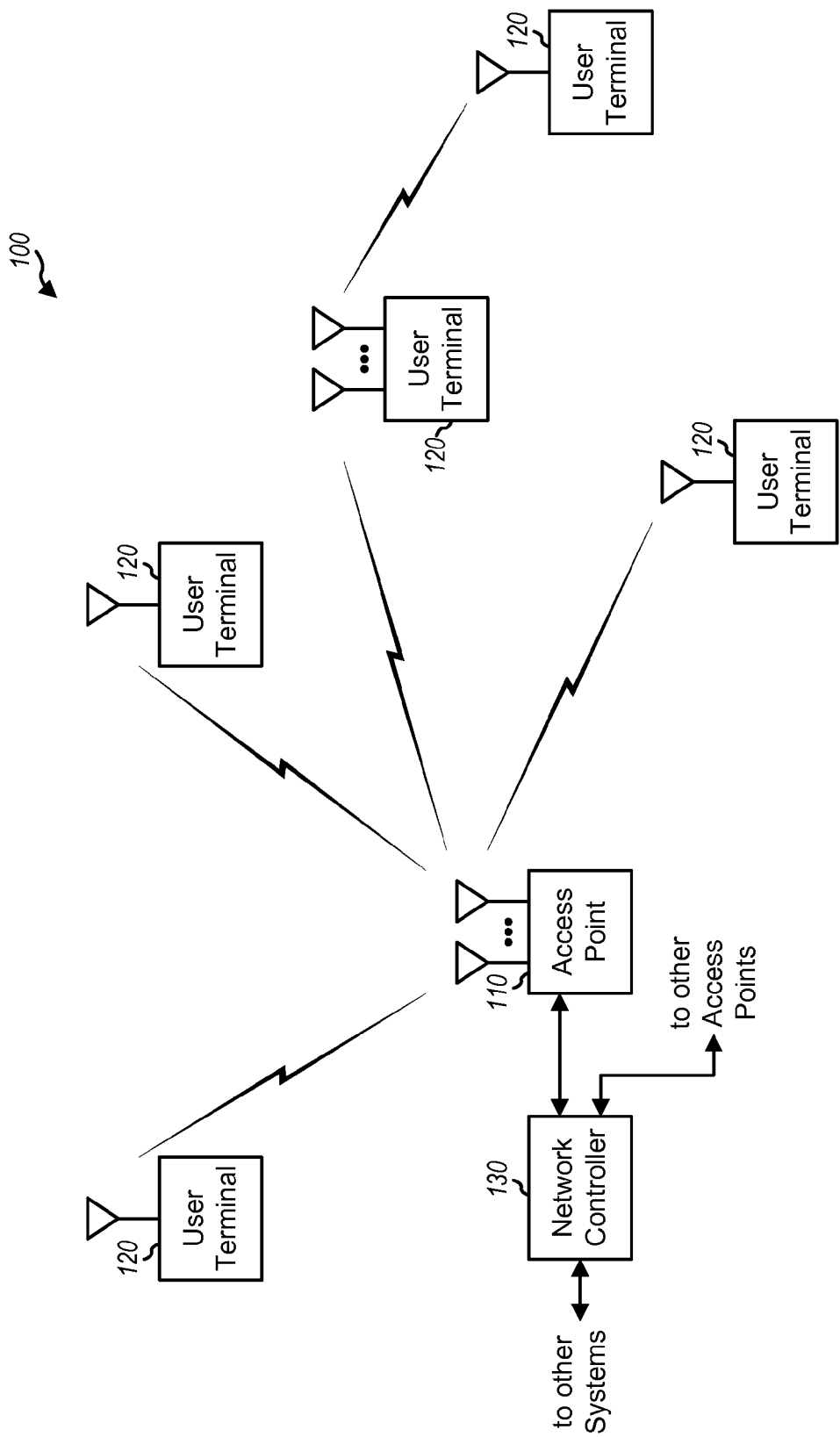
FIG. 1 shows a WLAN with an access point and multiple user terminals.

FIG. 1 shows a WLAN 100 with an access point 110 and multiple user terminals 120. An access point is a station that communicates with the user terminals. An access point may also be called, and may contain some or all of the functionality of, a base station, a base transceiver subsystem (BTS), a Node B, and/or some other network entity. User terminals 120 may be distributed throughout WLAN 100, and each user terminal may be fixed or mobile. A user terminal may also be called, and may contain some or all of the functionality of, a mobile station, a user equipment (UE), and/or some other device. A user terminal may be a wireless device, a cellular phone, a laptop computer, a personal digital assistant (PDA), a wireless modem card, and so on. A user terminal may communicate with an access point or another user terminal.

For a centralized network architecture, a network controller 130 couples to the access points and provides coordination and control for these access points. Network controller 130 may be a single network entity or a collection of network entities. For a distributed architecture, the access points may communicate with one another as needed without the uses of network controller 130.

In general, a WLAN may include any number of stations, where a station (STA) may be an access point or a user terminal. A station may implement any one or any combination of IEEE 802.11 standards, e.g., 802.11b and/or 802.11g. A station may also implement a range extension mode that supports at least one data rate that is lower than 1 Mbps. For example, the range extension mode may support data rates of 500 kilo bits/second (Kbps), 250 Kbps, 125 Kbps, and so on, or a combination of these lower data rates. In general, packet transmissions at progressively lower data rates may be received at progressively lower SNRs, which may be achieved for progressively larger geographic areas. This is because a certain minimum bit-energy to noise-density (Eb/No) is typically required for reliable reception of a packet transmission. Hence, as the data rate decreases, a data bit is transmitted over a longer time duration, the required signal level at the receiving station is reduced, and the transmission range is increased. For example, a packet transmission at 125 Kbps may be reliably received at an SNR that is much lower than the required SNR for 1 Mbps. Hence, the 125 Kbps transmission has a longer transmission range and a greater coverage area than the 1 Mbps transmission.

Figure 2:
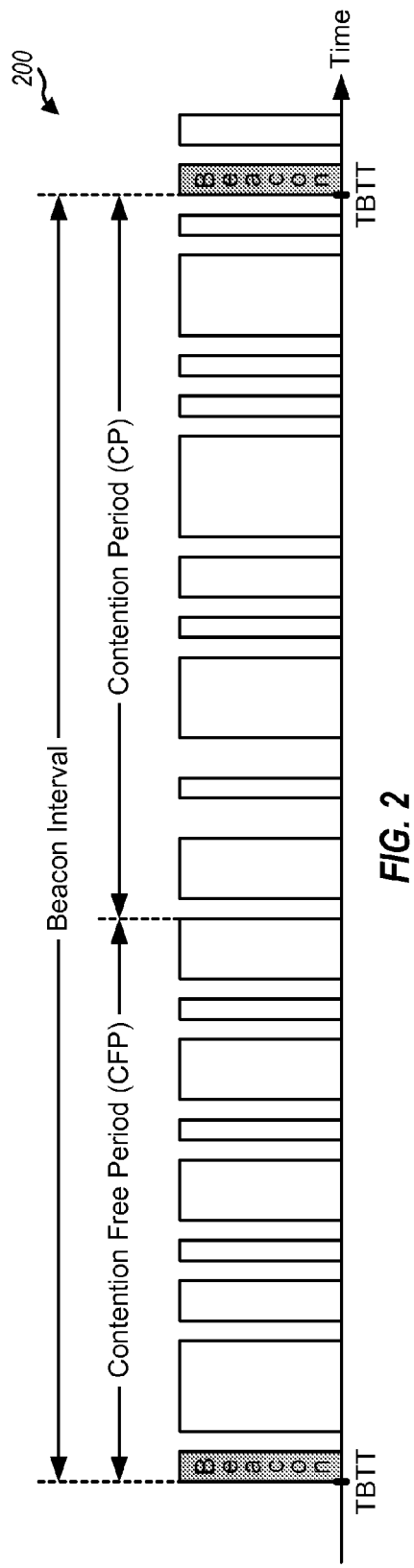
FIG. 2 shows a transmission timeline for the WLAN.

FIG. 2 shows an example transmission timeline 200 for WLAN 100. Access point 110 maintains a timeline for all transmissions covered by the access point. Access point 110 periodically transmits a beacon that carries (1) a preamble used by other stations for acquisition and (2) various types of information used to support communication with the access point. The information in the beacon includes (1) an access point identifier (AP ID) that allows the user terminals to detect and identify the access point and (2) a beacon interval that indicates the time period between consecutive beacon transmissions. The beacon is transmitted at target beacon transmit times (TBTTs), which are spaced apart by the beacon interval.

The time period between TBTTs may be divided into a contention free period (CFP) and a contention period (CP). The contention free period covers the beacon as well as other transmissions that are controlled or scheduled by the access point. Hence, only one station transmits on the wireless medium at any given moment during the contention free period and there is no contention among the stations for the wireless medium during this period. The contention period covers transmissions that are scheduled by the access point as well as transmissions that are not scheduled by the access point. Hence, more than one station may transmit simultaneously on the wireless medium during the contention period.

IEEE 802.11 specifies three channel access functions, which are called a distributed coordination function (DCF), a point coordination function (PCF), and a hybrid coordination function (HCF). The DCF supports contention-based channel access via a carrier sense multiple access with collision avoidance (CSMA/CA) protocol. For the DCF, packet transmissions are not scheduled, and a station may transmit if it senses that the wireless medium is not busy. The DCF is operational during the contention period.

The PCF supports contention-free channel access via a centralized point coordinator that is implemented at the access point. For the PCF, the point coordinator polls specific stations for transmission, and a station may transmit only if it is polled. The point coordinator may also transmit data to specific stations. The PCF is operational during the contention free period.

The HCF supports (1) an enhanced distributed channel access (EDCA), which is a contention-based channel access scheme, and (2) an HCF-controlled channel access (HCCA), which is a contention-free channel access scheme that is controlled by a hybrid coordinator. Packet transmissions are not scheduled for the EDCA and are scheduled for the HCCA. The EDCA is used during the contention period, and the HCCA may be used in the contention period or the contention free period. The HCF, EDCA and HCCA are described in IEEE Std 802.11e (or simply, "802.11e").

In general, a packet transmission in a WLAN may be scheduled or unscheduled. A station may receive an unscheduled packet transmission at any time from another station during the contention period and typically does not know the identity of the transmitting station until after the packet has been detected. A station may receive a scheduled packet transmission from another station at a specific time instant or within a time window and typically knows the identity of the transmitting station prior to receiving the packet transmission.

WLAN stations are typically designed to receive unscheduled packet transmissions. Since the stations within a WLAN typically operate without locking their clocks to a common reference frequency, each station normally performs acquisition independently for each received packet transmission. Acquisition normally entails detecting for the presence of a packet transmission and determining the timing and frequency of the detected packet transmission. Acquisition is often achieved based on a preamble that is sent with each packet in IEEE 802.11.

For IEEE 802.11, traffic data is processed by a medium access control (MAC) layer as MAC protocol data units (MPDUs). Each MPDU is processed by a physical layer convergence protocol (PLCP) and encapsulated in a PLCP protocol data unit (PPDU). Each PPDU is further processed by a physical layer and transmitted via the wireless medium. A PPDU is often referred to as a packet.

Figure 3:
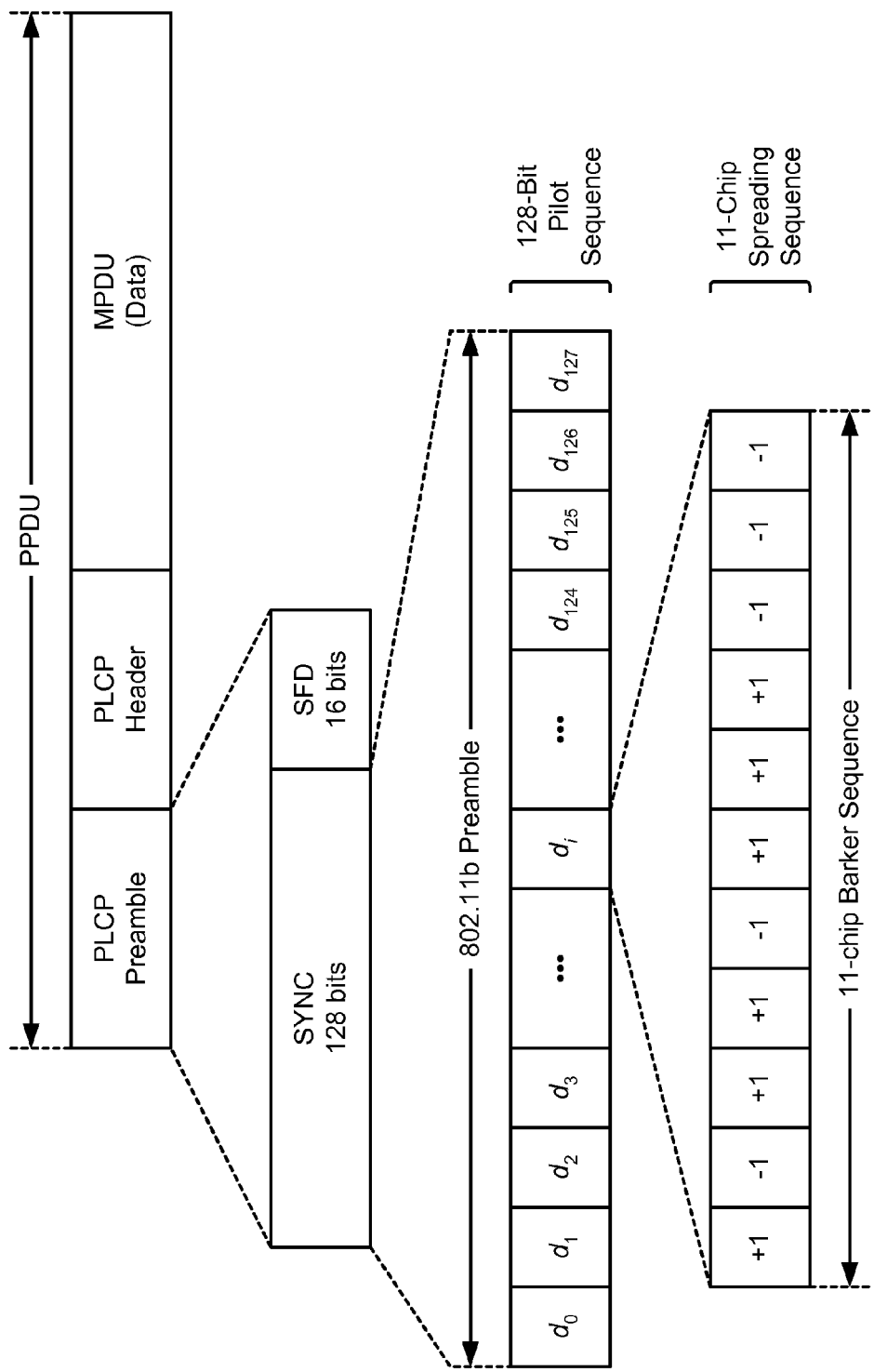
FIG. 3 shows a packet and a preamble for 802.11b.

FIG. 3 shows a PPDU format for 802.11b/g. A PPDU includes a PLCP preamble, a PLCP header, and an MPDU. The PLCP preamble includes a PLCP synchronization (SYNC) field and a start frame delimiter (SFD) field. The SYNC field carries a fixed 128-bit sequence that is often referred to as a preamble. The SFD field carries a fixed 16-bit sequence that indicates the start of the PLCP header. The PLCP header includes various fields that convey the data rate, duration, and other information for the MPDU. The MPDU carries traffic data and has a variable length. The PLCP preamble and PLCP header are sent at 1 Mbps. The PLCP preamble contains a total of 144 bits, which are processed to generate 144 BPSK symbols. These 144 BPSK symbols are transmitted in 144 symbol periods, with each symbol period having a duration of 1 microsecond (μs).

FIG. 3 also shows the preamble for 802.11b. This preamble is composed of a known sequence of 128 pilot bits that is generated based on a pseudo-random number (PN) generator. The 128 pilot bits are denoted as $d_0$ through $d_{127}$. Each pilot bit is spread with an 11-chip spreading sequence of $\{+1, -1,$ +1, +1, −1, +1, +1, +1, −1, −1, −1}, which is called a Barker sequence. This preamble has a length of 128 μs.

A receiving station generates input samples for a received signal and correlates the input samples with the 128-bit pilot sequence and the 11-chip Baker sequence to detect for the presence of a preamble. The receiving station may perform coherent accumulation and non-coherent accumulation for preamble detection. Coherent accumulation refers to the accumulation, integration or sum of complex values, where the phases of the complex values affect the accumulation result. Non-coherent accumulation refers to the accumulation, integration or sum of real values, e.g., magnitudes. Preamble detection is described in detail below.

Detection performance is dependent on various factors such as SNR and frequency error/offset. For a packet received at a high SNR, a preamble may be easily detected by coherently accumulating over a small number of chips of the preamble. For a packet received at a low SNR, coherent accumulation over more chips may be required for reliable detection of the preamble.

Frequency error between the transmitting and receiving stations determines the number of chips that may be coherently accumulated without incurring significant combining loss. A large frequency error results in a large phase shift across the preamble. For example, a frequency error of ±40 parts per million (ppm) at 5.8 GHz corresponds to a phase shift of ±83° over the 11-chip Barker sequence. Frequency error thus results in the input samples being progressively more out of phase across the preamble and hence limits the number of chips that may be coherently accumulated.

A receiving station typically performs coherent accumulation over the 11-chip Barker sequence and non-coherent accumulation over the 128-bit pilot sequence. This scheme provides good detection performance for the worst-case frequency error and the required SNR for 1 Mbps, which is the lowest data rate supported by IEEE 802.11.

A receiving station may observe a low SNR for a low rate (e.g., 125 Kbps) packet transmission in the range extension mode. The receiving station may perform coherent accumulation over more than 11 chips (e.g., over 44 chips) in order to achieve good detection performance. The coherent accumulation interval may be selected based on the required SNR for the packet transmission, which is lower for the range extension mode. To account for more phase shift across a longer coherent accumulation interval, the receiving station may perform detection for multiple frequency hypotheses. Each frequency hypothesis corresponds to a different hypothesized frequency error between the transmitting and receiving stations. The frequency hypotheses may be selected such that coherent accumulation may be performed over the interval selected for the required SNR. In general, the coherent accumulation interval is limited by frequency offset, and coherent accumulation may be performed over a longer interval for lower frequency offset. For each frequency hypothesis, the receiving station may remove the hypothesized frequency error prior to performing coherent accumulation. The correct frequency hypothesis that comes closest to the actual frequency error will cause the smallest amount of phase shift across the coherent accumulation interval and provide the largest accumulated result.

The receiving station may perform preamble detection for multiple frequency hypotheses in order to achieve good detection performance at low SNRs with independent acquisition on each packet transmission. The acquisition hardware may be replicated multiple times in order to evaluate the multiple frequency hypotheses simultaneously. Each acquisition hardware may be each tuned to a different frequency hypothesis and may perform coherent accumulation over the selected interval. The acquisition hardware with the largest deflection statistic will be the one with the lowest frequency error. However, the replicated hardware may significantly increase the cost of the station, which is undesirable.

In an aspect, a receiving station determines the frequency error between a transmitting station and the receiving station based on one or more initial packet transmissions and corrects this frequency error for subsequent packet transmissions received from the transmitting station. The frequency correction techniques may be used whenever the receiving station knows the identity of the transmitting station. The receiving station may expect a number of packet transmissions from the same transmitting station under various operating scenarios such as, e.g., a voice over IP (VoIP) call, a large file transfer, and so on. In general, the expected packet transmissions may or may not be scheduled. The receiving station may perform acquisition for the expected packet transmissions after correcting or removing the known frequency error for the transmitting station. The residual frequency error is small after correcting for the known frequency error and allows the receiving station to perform coherent accumulation over a longer interval, which improves detection performance. In essence, the receiving station can perform acquisition for each expected packet transmission with a single correct frequency hypothesis.

The receiving station may perform initial acquisition using limited acquisition hardware. For example, the acquisition hardware may be able to evaluate only one frequency hypothesis for each packet transmission. In this case, the receiving station may perform acquisition with a different frequency hypothesis for each packet transmission. The receiving station can detect a packet transmission with high probability when the correct frequency hypothesis is selected. The receiving station may miss one or more packet transmissions before a preamble is detected. The missed packet transmissions may have a small impact on the overall performance since these packet transmissions may simply be for call setup and/or may be retransmitted.

Figure 4:
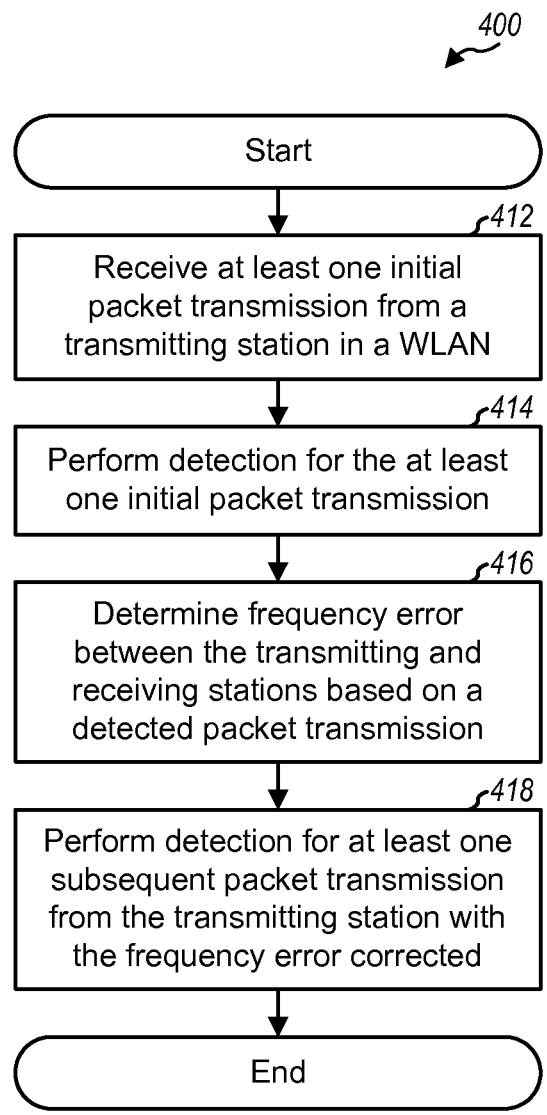
FIG. 4 shows a process for receiving data with frequency correction.

FIG. 4 shows an embodiment of a process 400 performed by a receiving station to receive data with frequency correction. The receiving station receives at least one initial packet transmission from a transmitting station in a WLAN (block 412). The receiving station performs detection for the at least one initial packet transmission (block 414). Depending on its hardware capability, the receiving station may perform detection for each packet transmission with one or multiple frequency hypotheses. The receiving station determines the frequency error between the transmitting and receiving stations based on a detected packet transmission, which is typically the last initial packet transmission (block 416). The receiving station then performs detection for at least one subsequent packet transmission from the transmitting station with the frequency error corrected (block 418). The frequency error correction may be achieved by (1) adjusting the frequency of a downconversion local oscillator (LO) signal at the receiving station and/or (2) digitally rotating the input samples, as described below.

The initial and subsequent packet transmissions may be sent at a data rate that is lower than 1 Mbps for the range extension mode. The packet transmissions may also be sent at a data rate supported by IEEE 802.11. The subsequent packet transmissions may or may not be scheduled.

The receiving station may perform coherent accumulation over more than 11 chips to detect a packet transmission. The receiving station may use the same or different coherent accumulation intervals for the initial and subsequent packet transmissions. For example, the receiving station may perform coherent accumulation over (1) a first interval for initial acquisition when the identity of the transmitting station is not known and (2) a second interval that is longer than the first interval for subsequent acquisition when the identity of the transmitting station is known. A short interval may be used for initial acquisition to account for channel fades, unknown frequency error, etc. A longer interval may be used for subsequent acquisition for more reliable detection.

Figure 5:
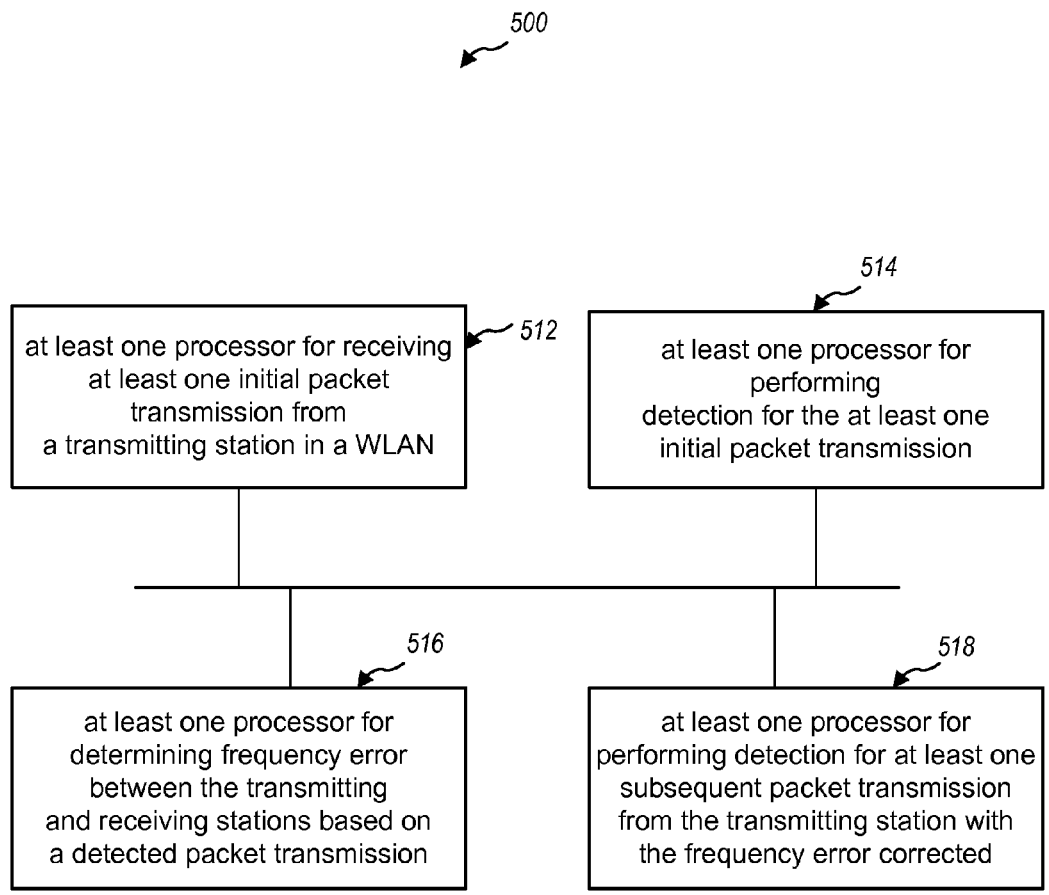
FIG. 5 shows an apparatus for receiving data with frequency correction.

FIG. 5 shows an embodiment of an apparatus 500 for receiving data with frequency correction. Apparatus 500 includes at least one processor 512 for receiving at least one initial packet transmission from a transmitting station in a WLAN, at least one processor 514 for performing detection for the at least one initial packet transmission, at least one processor 516 for determining the frequency error between the transmitting and receiving stations based on a detected packet transmission, and at least one processor 518 for performing detection for at least one subsequent packet transmission from the transmitting station with the frequency error corrected.

In another aspect, a preamble is generated with a spreading sequence that is longer than 11 chips. A receiving station may perform coherent accumulation over the length of the longer spreading sequence to achieve more reliable detection of the preamble at low SNRs, which may be encountered in the range extension mode. The preamble may also be extended longer to also improve detection performance.

Figure 6:
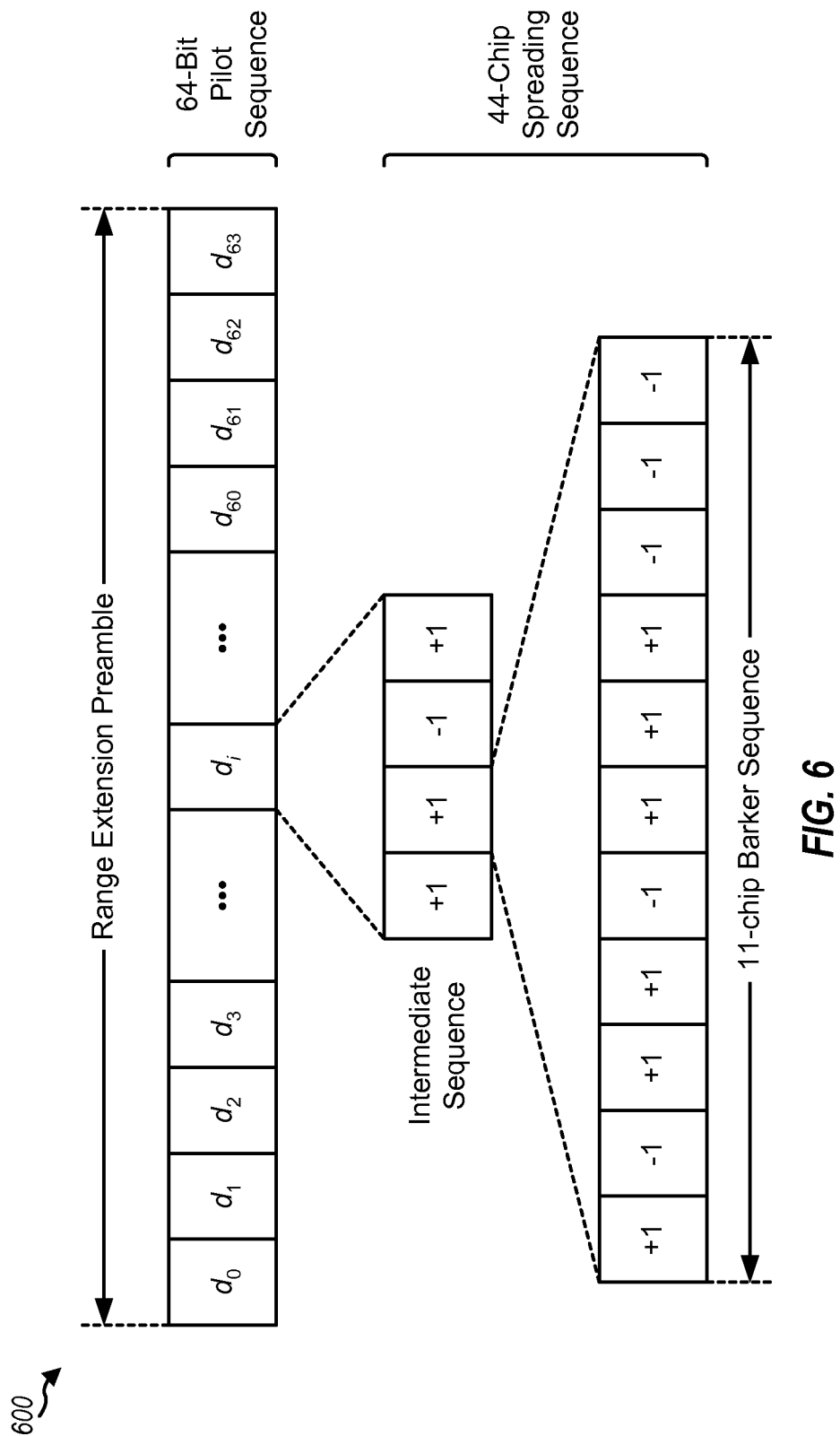
FIG. 6 shows a preamble for a range extension mode.

FIG. 6 shows an embodiment of a preamble 600 that may be used for the range extension mode. For this embodiment, the preamble is composed of a sequence of 64 pilot bits that may be generated based on a PN generator. The 64 pilot bits are denoted as $d_0$ through $d_{63}$. For this embodiment, each pilot bit $d_i$, for i=0, . . . , 63, is spread with an intermediate sequence of four binary values {+1, +1, −1 and +1}, and each binary value is further spread with the 11-chip Barker sequence. Each pilot bit is thus spread with a 44-chip spreading sequence that is composed of four instances of the 11-chip Barker sequence, with the third instance of the Barker sequence being inverted in polarity relative to the other three instances of the Barker sequence. This preamble has a length of 256 μs and can provide reliable detection for data rates down to 125 Kbps.

For the embodiment shown in FIG. 6, a receiving station may perform coherent accumulation over the 44-chip spreading sequence and may perform non-coherent accumulation over the 64-bit pilot sequence. For IEEE 802.11, the maximum frequency error is ±40 ppm, which corresponds to ±232 KHz at a center frequency of 5.8 GHz. The maximum frequency error of ±232 KHz corresponds to a phase shift of ±334° across the 44-chip spreading sequence. The receiving station may evaluate three frequency hypotheses in order to reduce the worst-case phase shift to ±111°, which corresponds to a combining loss of up to 1.4 decibels (dB). These three frequency hypotheses are for the nominal frequency, +26.7 ppm from the nominal frequency, and −26.7 ppm from the nominal frequency.

For the embodiment shown in FIG. 6, the receiving station may perform detection for three frequency hypotheses, e.g., during call setup. If the acquisition hardware can evaluate only one frequency hypothesis for each packet transmission, then the receiving station may cycle through the three frequency hypotheses and may evaluate a different frequency hypothesis for each packet transmission. The receiving station should be able to detect the preamble in at most three packet transmissions. Upon detecting a packet transmission, the receiving station determines the frequency error and corrects for this frequency error for subsequent packet transmissions. The receiving station should be able to detect each subsequent packet transmission with high probability.

FIG. 6 shows a specific embodiment of a preamble for the range extension mode. For this embodiment, the preamble is composed of three sequences: (1) a long/outer 64-bit pilot sequence, (2) an intermediate sequence of four binary values for each pilot bit, and (3) a short/inner 11-chip Barker sequence for each binary value. This preamble design is advantageous since it uses the 11-chip Barker sequence as a basic building block. Hence, other stations that perform coherent accumulation over the 11-chip Barker sequence can also detect this preamble and recognize that the wireless medium is busy.

Various other preamble designs may also be used for the range extension mode. In general, a preamble may be generated with any number of sequences, and each sequence may be of any length. In an embodiment, the preamble is composed of a single sequence of 1408 or more chips, where 1408=128×11. In another embodiment, the preamble is composed of two sequences—a pilot sequence and a spreading sequence that is longer than 11 chips. For example, a spreading sequence of 44 pseudo-random chips having good correlation properties may be used for the preamble. In yet another embodiment, the preamble is composed of more than two sequences.

Figure 7:
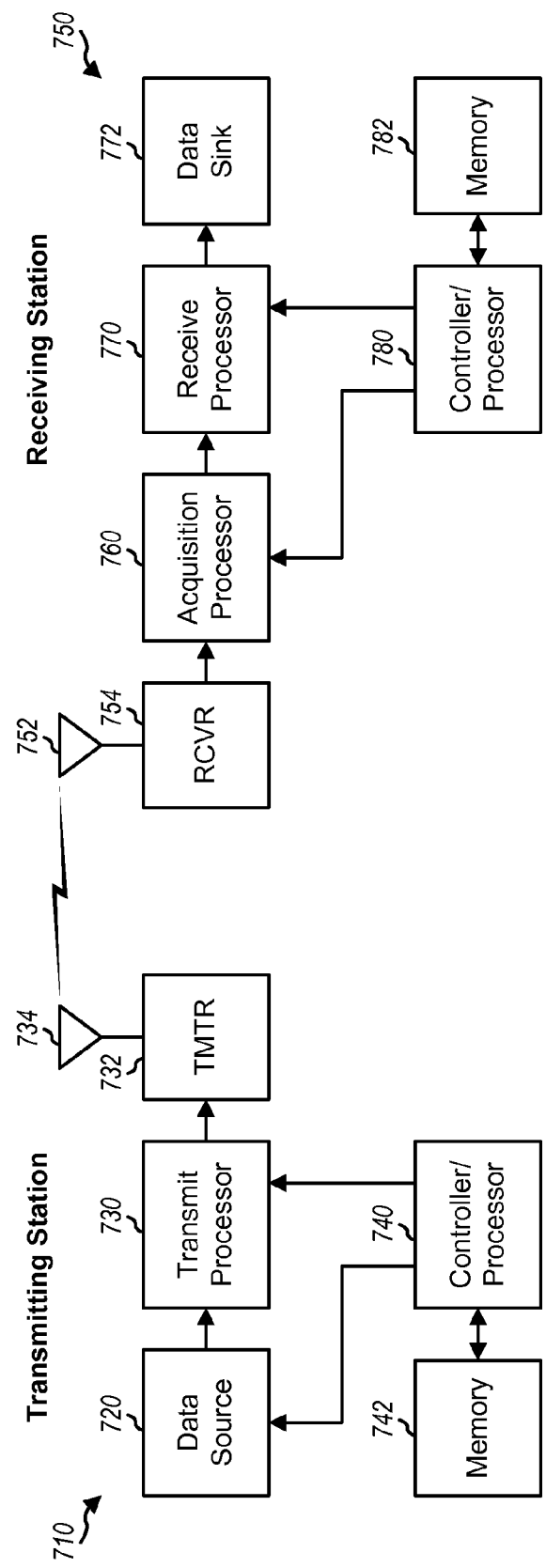
FIG. 7 shows a block diagram of a transmitting station and a receiving station.

FIG. 7 shows a block diagram of a transmitting station 710 and a receiving station 750 in WLAN 100. Stations 710 and 750 may each be an access point or a user terminal. For simplicity, each station is equipped with a single antenna for the embodiment shown in FIG. 7.

At transmitting station 710, a transmit processor 730 receives traffic data from a data source 720 and processes (e.g., encodes, interleaves, symbol maps, and spreads) the traffic data in accordance with a selected data rate. Transmit processor 730 also generates a preamble (e.g., as shown in FIG. 3 or 6), multiplexes the chips generated for traffic data and the chips generated for the preamble, and provides output chips. A transmitter (TMTR) 732 processes (e.g., converts to analog, amplifies, filters, and upconverts) the output chips and generates a modulated signal, which is transmitted via an antenna 734.

At receiving station 750, an antenna 752 receives the transmitted signal and provides a received signal to a receiver (RCVR) 754. Receiver 754 processes and digitizes the received signal and provides input samples to an acquisition processor 760. Acquisition processor 760 performs acquisition, detects for packet transmissions, determines and corrects for frequency error, and provides despread symbols, as described below. A receive processor 770 processes the despread symbols in a manner complementary to the processing performed by transmit processor 730 and provides decoded data to a data sink 772.

Controllers/processors 740 and 780 direct operation at transmitting station 710 and receiving station 750, respectively. Memories 742 and 782 store data and/or program codes for stations 710 and 750, respectively.

Receiver 754 provides complex-valued input samples at the sample rate, which is equal to or higher than the chip rate. For simplicity, the following description assumes that the input samples are provided at the chip rate. For 802.11b, the chip rate is 11 Mcps, and the bit rate and symbol rate are 1 Mbps for the preamble. Hence, a symbol period ($T_s$) is 1 μs, and a chip period ($T_c$) is 90.9 nanoseconds (ns) for the 802.11b preamble. For the preamble shown in FIG. 6, the bit rate and symbol rate are 250 Kbps, and a symbol period ($T_s$) is 4 μs and covers 44 chips. In the following description, "n"

is an index for chip period, "k" is an index for frequency bin, and "i" is an index for the pilot bits in the preamble.

FIG. 8 shows a block diagram of an acquisition processor 760a, which is an embodiment of acquisition processor 760 in FIG. 7. Within processor 760a, a multiplier 810 multiplies the input samples with a complex sinusoidal signal $e^{j2\pi \cdot f \cdot n}$ and provides rotated samples. If the identity of the transmitting station is not known, then the frequency of the sinusoidal signal is determined by a frequency hypothesis being evaluated. If the identity of the transmitting station is known, then the frequency of the sinusoidal signal is determined by the frequency error between the transmitting and receiving stations.

A despreader 820 despreads the rotated samples and provides despread symbols. During acquisition, despreader 820 despreads the rotated samples over L chips and provides despread symbols at the chip rate, where L may be equal to 11, 22, 44, or some other value. For each chip period n, despreader 820 multiplies L input samples for chip periods n through n−L+1 with L chips of an L-chip spreading sequence, accumulates the L multiplication results, and provides a despread symbol x(n) for that chip period. In an embodiment, L is equal to 11, the L-chip spreading sequence is the 11-chip Barker sequence, and despreader 820 performs despreading over the length of the 11-chip Barker sequence. In another embodiment, L is equal to 44, the L-chip spreading sequence is the 44-chip spreading sequence shown in FIG. 6, and despreader 820 performs despreading over the length of the 44-chip spreading sequence. For other embodiments, L may be equal to other values, and other L-chip spreading sequences may be used for despreading. In any case, despreader 820 performs a sliding correlation of the input samples with the L-chip spreading sequence to obtain a despread symbol for each chip period (instead of each symbol period) and provides L despread symbols for each L-chip interval. These L despread symbols correspond to L different possible chip offsets (or L timing hypotheses) for the correct timing.

For the embodiment shown in FIG. 8, a unit 840 computes the squared magnitude of each despread symbol from despreader 820. In another embodiment that is not shown in FIG. 8, multiple despread symbols are coherently accumulated, and unit 840 computes the squared magnitude of each coherently accumulated result. For both embodiments, an accumulator 850 performs non-coherent accumulation for each different chip offset. If L=11, e.g., for the preamble shown in FIG. 3, then there are 11 different chip offsets and accumulator 850 may accumulate the magnitude squares of up to 128 despread symbols for each chip offset. If L=44, e.g., for the preamble shown in FIG. 6, then there are 44 different chip offsets and accumulator 850 may accumulate the magnitude squares of up to 64 despread symbols for each chip offset. Accumulator 850 performs a sliding non-coherent accumulation and, for each L-chip interval, provides L accumulated results for L different chip offsets.

A signal/preamble detector 870 receives the L accumulated results for each L-chip interval, compares each accumulated result against a threshold $S_{th}$, and declares the presence of a preamble if the accumulated result exceeds the threshold. Signal/preamble detector 870 continues to monitor the accumulated results to search for a peak value and provides the chip offset for this peak value as the timing (tau) for the detected preamble.

A symbol buffer 830 stores the despread symbols from despreader 820. Upon detection of the preamble, a frequency error estimator 880 receives the despread symbols from symbol buffer 830 and the timing (tau) from signal/preamble detector 870. Frequency error estimator 880 determines the frequency error in the detected preamble and provides a frequency error estimate.

FIG. 9A shows a block diagram of an acquisition processor 760b, which is another embodiment of acquisition processor 760 in FIG. 7. Within processor 760b, a multiplier 910 multiplies the input samples with a complex sinusoidal signal and provides rotated samples. A despreader 920 despreads the rotated samples with an L-chip spreading sequence and provides L despread symbols for each L-chip interval. Multiplier 910 and despreader 920 operate in the same manner as multiplier 810 and despreader 820, respectively, in FIG. 8.

A delay multiplier 940 generates 1-symbol and 2-symbol delayed products of the despread symbols, as described below. A 1-symbol delayed product $y_1(n)$ is indicative of the phase difference between two despread symbols x(n) and $x(n-T_s)$ that are separated by one symbol period. A 2-symbol delayed product $y_2(n)$ is indicative of the phase difference between two despread symbols x(n) and $x(n-2T_s)$ that are separated by two symbol periods. A differential correlator 950a receives the 1-symbol delayed products $y_1(n)$, performs correlation between the 1-symbol delayed products and the expected values for these products, and provides a correlation result $c_1(n)$ for each chip period. Similarly, a differential correlator 950b receives the 2-symbol delayed products $y_2(n)$, performs correlation between the 2-symbol delayed products and the expected values for these products, and provides a correlation result $c_2(n)$ for each chip period.

The phases of the correlation results $c_2(n)$ from differential correlator 950b may not be aligned with the phases of the corresponding correlation results $c_1(n)$ from differential correlator 950a. A multiplier 962 multiplies each correlation result $c_2(n)$ from differential correlator 950b with a complex phasor $e^{-j\theta_q}$ for Q different hypothesized phases and provides a set of Q phase-rotated correlation results for each chip period. For example, the hypothesized phases may be {0, 60°, −60°} for Q=3, {0, 90°, 180°, −90°} for Q=4, and so on. The Q hypothesized phases may be selected to cover the possible range of relative phases. For example, the maximum phase difference between the 1-symbol and 2-symbol delayed correlations is approximately 90 degrees for the maximum frequency error of ±232 KHz. Hence, if three hypothesized phases of 0, 60°, and −60° are used, then least one hypothesized phase is within 30°.

For each chip period n, an adder 964 coherently adds the correlation result from differential correlator 950a with each of the Q corresponding phase-rotated correlation results from multiplier 962 and provides Q combined correlation results $z_q(n)$, for q=1, . . . , Q. For each chip period n, a unit 966 computes the squared magnitude of each of the Q combined correlation results, identifies the largest squared magnitude value among the Q squared magnitude values, and provides this largest squared magnitude value Z(n). For each chip period n, a signal/preamble detector 970 compares the largest squared magnitude value Z(n) against a threshold $Z_{th}$ and declares the presence of a preamble if Z(n) exceeds the threshold $Z_{th}$. Signal/preamble detector 970 continues to monitor the squared magnitude values to search for a peak value and provides the chip offset for this peak value as the timing (tau) for the detected preamble.

A symbol buffer 930 stores the despread symbols from despreader 920. A frequency error estimator 980 determines the frequency error in the detected preamble and provides a frequency error estimate.

Figure 9B:
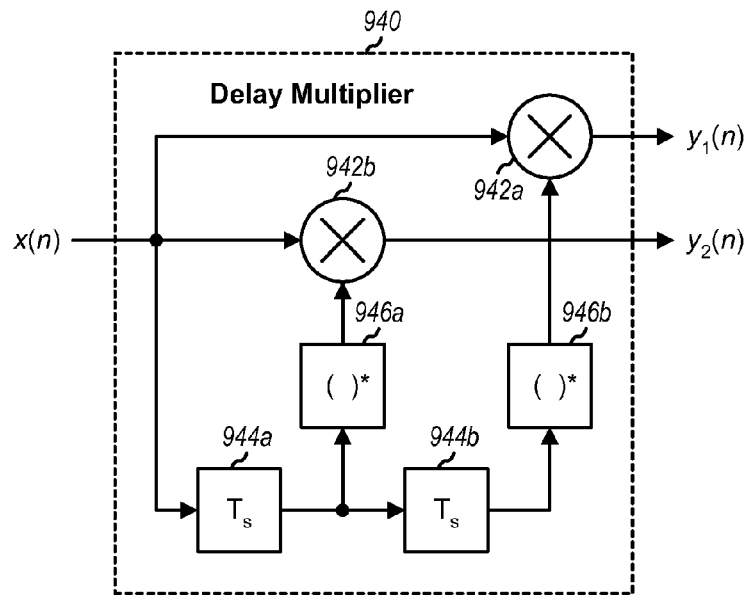

FIG. 9B shows an embodiment of delay multiplier 940 in FIG. 9A. Within delay multiplier 940, the despread symbols x(n) are provided to two multipliers 942a and 942b and also to two series-coupled delay units 944a and 944b. Each delay unit 944 provides a delay of one symbol period $T_s$, which is equal to 11 chip periods for L=11 and 44 chip periods for L=44. Units 946a and 946b provide the complex conjugate of the despread symbols from delay units 944a and 944b, respectively. Multiplier 942a multiplies the despread symbol x(n) for each chip period n with the output of unit 946b and provides the 1-symbol delayed product $y_1(n)$ for that chip period. Multiplier 942b multiplies the despread symbol for each chip period n with the output of unit 946a and provides the 2-symbol delayed product $y_2(n)$ for that chip period.

Figure 9C:
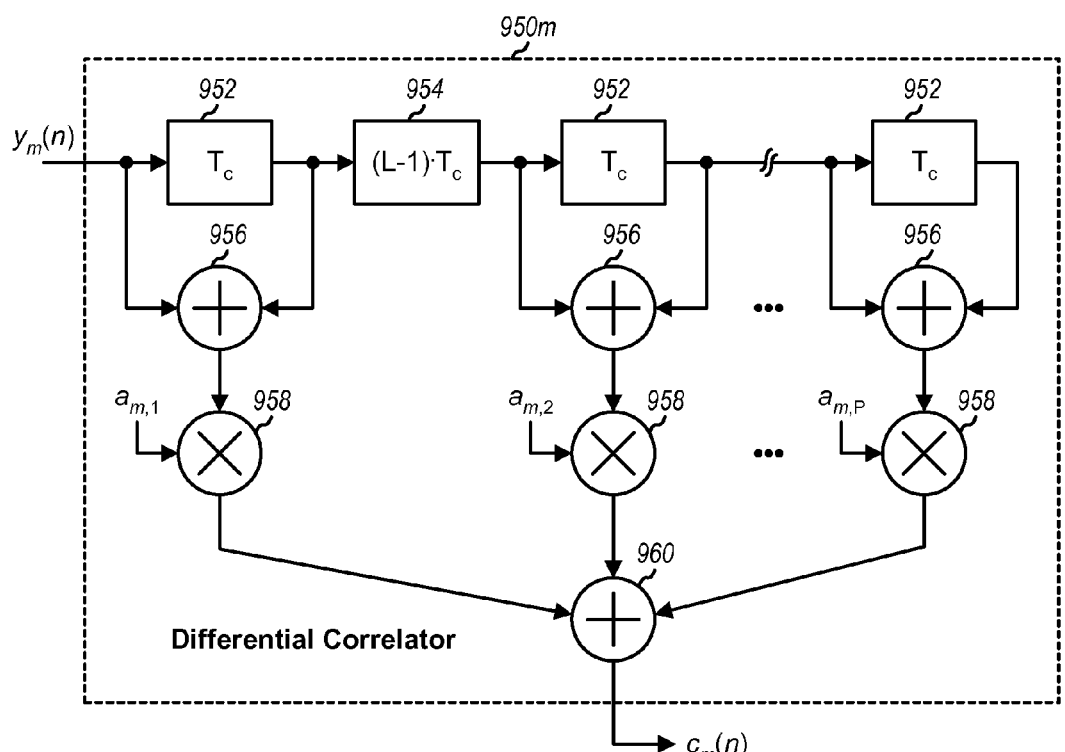

FIG. 9C shows an embodiment of a differential correlator 950m, which may be used for each of differential correlators 950a and 950b in FIG. 9A. Within differential correlator 950m, the m-symbol delayed products $y_m(n)$, for m∈{1, 2}, are provided to a sequence of alternating delay units 952 and 954. Each delay unit 952 provides a delay of one chip period, each delay unit 954 provides a delay of L-1 chip periods, and each pair of delay units 952 and 954 provides a total delay of L chip periods, which is one symbol period. Differential correlator 950m includes P delay units 952 and P-1 delay units 954. For 1-symbol delayed differential correlator 950a, P is equal to 127 for the 802.11b preamble shown in FIG. 3 and is equal to 63 for the preamble shown in FIG. 6. For 2-symbol delayed differential correlator 950b, P is equal to 126 for the 802.11b preamble shown in FIG. 3 and is equal to 62 for the preamble shown in FIG. 6. P is thus dependent on the number of bits in the preamble (B) and the amount of delay (m), or P=B-m.

P adders 956 couple to P delay units 952. Each adder 956 sums the input and output of an associated delay unit 952 and provides an output. P multipliers 958 couple to P adders 956 and also receive P expected values $a_{m,1}$ $a_{m,P}$ for the P m-symbol delayed products. Expected value $a_{m,i}$, for m={1, 2} and i=1, ..., P, may be computed as $a_{1,i}=d_{i-1} \cdot d_i$ for 1-symbol delayed differential correlator 950a and as $a_{2,i}=d_{i-1} \cdot d_{i+1}$ for 2-symbol delayed differential correlator 950b. Expected value $a_{mm,i}$ is then computed in the same manner as the m-symbol delayed product, which is $y_m(n)=x(n) \cdot x^*(n-m)$. However, because the pilot bits are real values, the complex conjugate may be ignored for the expected values, e.g., $a_{1,i}=d_{i-1} \cdot d^*_i=d_{i-1} \cdot d_i$. Each multiplier 958 multiplies the output of an associated summer 956 with its expected value $a_{m,i}$. For each chip period n, an adder 960 sums the outputs from all P multipliers 958 and provides a correlation result $c_m(n)$ for that chip period.

Figure 10:
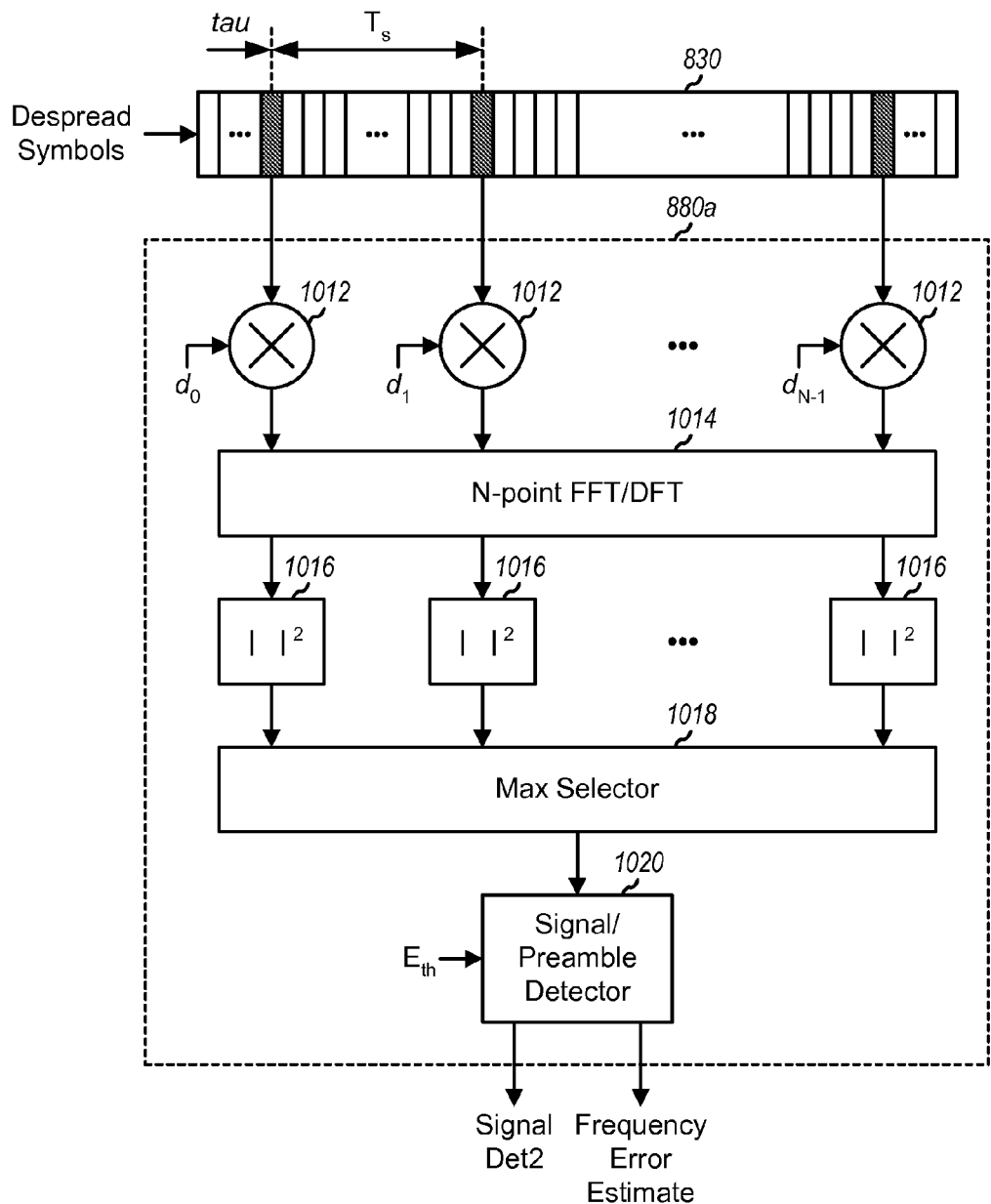
FIG. 10 shows a block diagram of a frequency error estimator.

FIG. 10 shows a block diagram of a frequency error estimator 880a, which is an embodiment of frequency error estimator 880 in FIG. 8 and frequency error estimator 980 in FIG. 9A. Frequency error estimator 880a receives from symbol buffer 830 or 930 N despread symbols that are spaced apart by L chip periods (or one symbol period) starting at the timing tau provided by signal/preamble detector 870 or 970. The first despread symbol is thus time-aligned with the best timing hypothesis. N may be any integer value that is less than or equal to the number of pilot bits in the preamble, e.g., N may be 32, 64, or 128. Within frequency error estimator 880a, N multipliers 1012 receive the N despread symbols and N corresponding pilot bits in the preamble. Each multiplier 1012 multiplies its despread symbol with its pilot bit $d_i$ to remove the modulation on that despread symbol. A unit 1014 receives the N outputs from N multipliers 1012, performs an N-point fast Fourier transform (FFT) or discrete Fourier transform (DFT) on these N outputs, and provides N frequency-domain values for N frequency bins. N units 1016 receive the N frequency-domain values from FFT/DFT unit 1014. Each unit 1016 computes the squared magnitude of its frequency-domain value and provides the detected energy for a respective frequency bin k.

After removing the modulation with multipliers 1012, the N outputs from these multipliers may have a periodic component. This periodic component is caused by frequency error between the transmitting and receiving stations. FFT/DFT unit 1014 provides a spectral response of the N outputs from multipliers 1012. The frequency bin with the largest detected energy is indicative of the frequency error between the transmitting and receiving stations.

A selector 1018 selects the largest detected energy among the N detected energies for the N frequency bins. A signal/preamble detector 1020 compares the largest detected energy against a threshold $E_{th}$, declares signal detection if the largest detected energy is greater than the threshold $E_{th}$, and provides the frequency bin with the largest detected energy as the frequency error estimate. The threshold $E_{th}$ may be set equal to the total received energy for the preamble times a scaling factor. Signal/preamble detection may be performed in multiple stages (e.g., with detector 870 or 970 and detector 1020) to improve detection performance.

In another embodiment of preamble detection and frequency error estimation, the input samples are correlated with the pilot sequence for different hypothesized frequency errors. For each hypothesized frequency error, the input samples are rotated by that frequency error, the rotated samples are correlated with the pilot sequence, the correlation result is compared against a threshold, and signal/preamble detection is declared if the correlation result exceeds the threshold. The correlation may be performed in the time domain with a finite impulse response (FIR) filter structure or in the frequency domain with an FFT-multiply-IFFT operation. The frequency error estimate is given by the hypothesized frequency error that yields the largest correlation result exceeding the threshold.

In yet another embodiment of frequency error estimation, the input samples are initially despread to obtain despread symbols at chip rate, as shown in FIG. 8 or 9A. The despread symbols are then multiplied with the corresponding pilot bits to remove the pilot modulation. The resultant symbols are used to generate 1-symbol and 2-symbol delayed products, e.g., using delay multiplier 940 in FIG. 9B. The delayed products for each delay are processed to generate a complex value for that delay. For each delay m, where m={1, 2}, the m-symbol delayed products are provided to L-1 series-coupled chip-spaced delay units to obtain m-symbol delayed products at L different chip offsets. For each chip offset, the m-symbol delayed products for that chip error are coherently accumulated across the preamble. The L accumulated results for the L chip offsets may be combined (e.g., using maximal ratio combining) to generate a complex value $V_m$ for delay m. The phase difference between the complex values $V_1$ and $V_2$ for 1-symbol and 2-symbol delays may be computed and used to derive the frequency error.

The frequency error estimate derived based on any of the techniques described above typically contains residual frequency error. This residual frequency error may be estimated by deriving a first L-tap channel estimate based on the first half of the preamble and deriving a second L-tap channel estimate based on the second half of the preamble, with both channel estimates being derived with the initial frequency offset estimate removed. The product of the second channel estimate and the complex conjugate of the first channel estimate may be computed, on a per tap basis. The L resultant products may be coherently summed to obtain the phase difference between the two channel estimates. Thresholding may be performed on (1) each channel tap prior to computing the product and/or (2) each product prior to summing the products. The thresholding removes channel taps with low energy below a predetermined threshold. The residual frequency error may be estimated based on the phase difference between the two channel estimates and may be combined with the initial frequency error estimate to obtain a final frequency error estimate.

The frequency error between the transmit and receiving stations may be removed by (1) adjusting the frequency of the downconversion LO signal within receiver 754 in FIG. 7 or (2) applying a sinusoidal signal with the proper frequency (which is the negative of the frequency error estimate) to multiplier 810 in FIG. 8 or multiplier 910 in FIG. 9A. Despreaders 820 and 920 may perform despreading over 11 or more chips during acquisition and over 11 chips during data reception.

Figure 11:
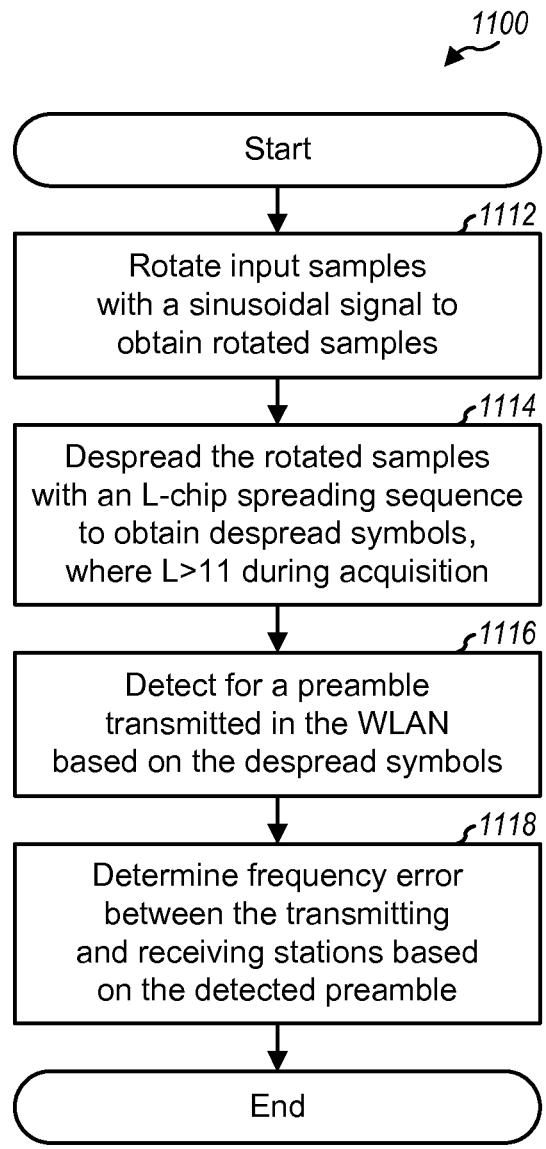
FIG. 11 shows a process for receiving data in the WLAN.

FIG. 11 shows an embodiment of a process 1100 performed by a receiving station to receive data. The receiving station rotates input samples with a sinusoidal signal to obtain rotated samples (block 1112). During initial acquisition without knowledge of the transmitting station's identity, the sinusoidal signal has a frequency corresponding to a hypothesized frequency error between a transmitting station and the receiving station. During subsequent acquisition with knowledge of the transmitting station's identity as well as during data reception, the sinusoidal signal has a frequency corresponding to the estimated frequency error between the transmitting and receiving stations. The receiving station then despreads the rotated samples with an L-chip spreading sequence to obtain despread symbols, where L may be greater than 11 (e.g., L=44) during acquisition and may be equal to 11 during data reception (block 1114).

For acquisition, the receiving station detects for a preamble transmitted in the WLAN based on the despread symbols (block 1116). The receiving station may perform non-coherent accumulation on the despread symbols to obtain accumulation results and may detect for the preamble based on the accumulated results, e.g., as shown in FIG. 8. The receiving station may also derive products of despread symbols for at least two delays, perform correlation of the products for each delay with the expected values for the delay, combine correlation results for the at least two delays, and detect for the preamble based on the combined correlation results, e.g., as shown in FIGS. 9A through 9C. The receiving station determines the frequency error between the transmitting and receiving stations based on the detected preamble (block 1118). The receiving station may determine the energies of the despread symbols for multiple frequency bins and may provide the frequency bin with the largest detected energy as the frequency error, e.g., as shown in FIG. 10.

Figure 12:
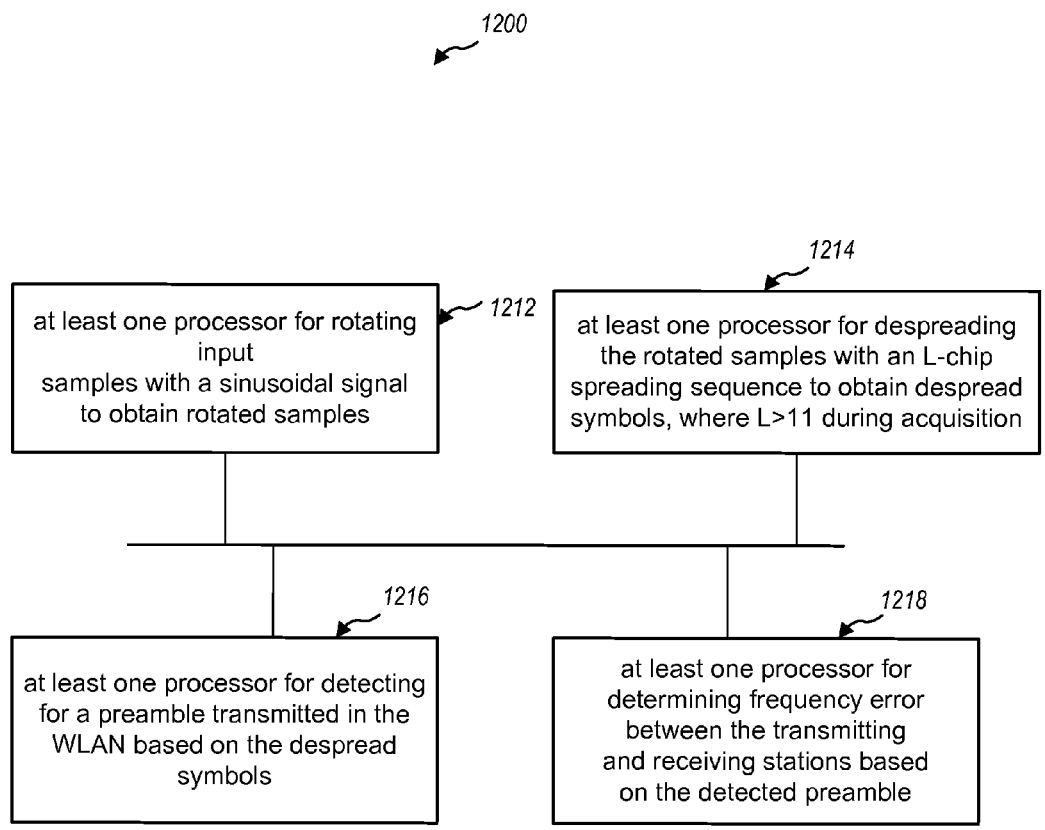
FIG. 12 shows an apparatus for receiving data in the WLAN.

FIG. 12 shows an embodiment of an apparatus 1200 for receiving data in a WLAN. Apparatus 1200 includes at least one processor 1212 for rotating input samples with a sinusoidal signal to obtain rotated samples, at least one processor 1214 for despreading the rotated samples with an L-chip spreading sequence to obtain despread symbols, where L>11 during acquisition, at least one processor 1216 for detecting for a preamble transmitted in the WLAN based on the despread symbols, and at least one processor 1218 for determining the frequency error between the transmitting and receiving stations based on the detected preamble.

For clarity, various range extension techniques have been specifically described for 802.11b/g. These techniques may also be used for other IEEE 802.11 standards. For example, in 802.11a, a preamble is composed of 10 short training symbols and 2 long training symbols, where each short training symbol is composed of 16 complex-valued symbols. The frequency correction techniques may be used to (1) determine and correct for the frequency error between the transmitting and receiving stations and (2) perform coherent accumulation over more than 16 complex-valued symbols, which may improve detection performance.

The range extension techniques described herein may be implemented by various means. For example, these techniques may be implemented in hardware, firmware, software, or a combination thereof. For a hardware implementation, the processing units at a receiving station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a transmitting station may also be implemented within one or more ASICs, DSPs, processors, and so on.

For a firmware and/or software implementation, the techniques may be implemented with codes (e.g., procedures, functions, instructions and so on) that may be used by at least one processor perform the functions described herein. The software codes may be stored in a memory (e.g., memory 742 or 782 in FIG. 7) and executed by a processor (e.g., processor 740 or 780). The memory may be implemented within the processor or external to the processor.

Further, for software implementations, the codes may be stored on or transmitted over or stored on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. An apparatus comprising:
   at least one processor configured to:
   generate a first sequence of bits;
   spread each of the bits in the first sequence with a second sequence of more than 11 chips to generate a range extension preamble, wherein the second sequence comprises a third sequence of at least two values, and wherein each of the at least two values in the third sequence is spread with a Barker sequence of at least 11 chips; and
   append the preamble to a packet to be transmitted in a wireless local area network (WLAN); and
   a memory coupled to the at least one processor.

2. The apparatus of claim 1, wherein the third sequence comprises four values.

3. The apparatus of claim 1, wherein the second sequence comprises at least 44 chips.

4. The apparatus of claim 1, wherein the preamble has a duration that is longer than 144 microseconds (μs).

5. An apparatus comprising:
   means for generating a first sequence of bits;
   means for spreading each of the bits in the first sequence with a second sequence of more than 11 chips to generate a range extension preamble, wherein the second sequence comprises a third sequence of at least two values, and wherein each of the at least two values in the third sequence is spread with a Barker sequence of at least 11 chips; and
   means for appending the preamble to a packet to be transmitted in a wireless local area network (WLAN).

6. The apparatus of claim 5, wherein the third sequence comprises four values.

7. The apparatus of claim 5, wherein the second sequence comprises at least 44 chips.

8. The apparatus of claim 5, wherein the preamble has a duration that is longer than 144 microseconds (μs).

9. A method comprising:
   generating a first sequence of bits;
   spreading each of the bits in the first sequence with a second sequence of more than 11 chips to generate a range extension preamble, wherein the second sequence comprises a third sequence of at least two values, and wherein each of the at least two values in the third sequence is spread with a Barker sequence of at least 11 chips; and
   appending the preamble to a packet to be transmitted in a wireless local area network (WLAN).

10. The method of claim 9, wherein the third sequence comprises four values.

11. The method of claim 9, wherein the second sequence comprises at least 44 chips.

12. The method of claim 9, wherein the preamble has a duration that is longer than 144 microseconds (μs).

13. A non-transitory computer program product comprising code for causing at least one processor to:
   generate a first sequence of bits;
   spread each of the bits in the first sequence with a second sequence of more than 11 chips to generate a range extension preamble, wherein the second sequence comprises a third sequence of at least two values, and wherein each of the at least two values in the third sequence is spread with a Barker sequence of 11 chips; and
   append the preamble to a packet to be transmitted in a wireless local area network (WLAN).

* * * * *